United States Patent
Jaussi et al.

(10) Patent No.: US 7,529,296 B2
(45) Date of Patent: May 5, 2009

(54) ADAPTIVE EQUALIZATION METHOD AND CIRCUIT FOR CONTINUOUS RUN-TIME ADAPTATION

(75) Inventors: James E. Jaussi, Hillsboro, OR (US); Bryan K. Casper, Hillsboro, OR (US); Ganesh Balamurugan, Hillsboro, OR (US); Stephen R. Mooney, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 755 days.

(21) Appl. No.: 11/232,492

(22) Filed: Sep. 21, 2005

(65) Prior Publication Data
US 2007/0064787 A1    Mar. 22, 2007

(51) Int. Cl.
*H03K 5/159* (2006.01)
(52) U.S. Cl. ............ 375/232; 375/229; 375/233; 375/316; 375/350; 333/18; 333/28 R; 708/300; 708/323

(58) Field of Classification Search ............ 375/232, 375/229, 233, 316, 350; 333/18, 28; 708/323, 708/300
See application file for complete search history.

(56) References Cited

U.S. PATENT DOCUMENTS

| | | | | |
|---|---|---|---|---|
| 5,297,166 A * | 3/1994 | Batruni | ............. | 375/233 |
| 6,697,424 B1 * | 2/2004 | Yang et al. | ............. | 375/233 |
| 6,704,059 B2 * | 3/2004 | Kim | ............. | 348/614 |
| 6,862,315 B1 * | 3/2005 | Garg et al. | ............. | 375/232 |
| 7,346,104 B2 * | 3/2008 | Yu et al. | ............. | 375/233 |
| 7,460,593 B2 * | 12/2008 | Lin et al. | ............. | 375/233 |
| 2002/0186764 A1 * | 12/2002 | Amin et al. | ............. | 375/233 |
| 2006/0034614 A1 * | 2/2006 | Chen et al. | ............. | 398/149 |
| 2007/0076125 A1 * | 4/2007 | Choi et al. | ............. | 348/614 |

* cited by examiner

*Primary Examiner*—Shuwang Liu
*Assistant Examiner*—Helene Tayong
(74) *Attorney, Agent, or Firm*—Erik R. Nordstrom

(57) ABSTRACT

In some embodiments disclosed herein, equalizers in a receiver are adapted during normal operation, as they extract bit data from a received bit stream, to account for channel and/or circuit fluctuations.

22 Claims, 2 Drawing Sheets

US 7,529,296 B2

ADAPTIVE EQUALIZATION METHOD AND CIRCUIT FOR CONTINUOUS RUN-TIME ADAPTATION

TECHNICAL FIELD

Embodiments disclosed herein relate generally to integrated circuit ("IC") devices and in particular to receivers with adaptive equalization.

BACKGROUND

Achievable data rates over I/O channels are increasingly limited by inter-symbol interference (ISI). A common way to address ISI is through the use of equalization. In some embodiments, adaptive equalizers are used to enable operation over a relatively wide variety of channels. The adaptation is typically achieved through the use of a an initial training sequence where the transmitter sends a known training pattern, and the equalizer(s) in the receiver is adapted to optimize some performance metric such as signal to noise ratio. At the end of the training period, tap coefficients within the equalizer(s) are set, and the transmitter begins to operate transmitting data to the receiver. However, the channel and circuits may experience slow variations due, for example, to voltage and temperature fluctuations. Accordingly, an improved solution to redress such variations may be desired.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In some embodiments disclosed herein, equalizers in a receiver are adapted during normal operation, as they extract bit data from a received bit stream, to account for channel and/or circuit fluctuations. In some embodiments, a pre-quantized output from at least one of the equalizers (or from a replica of at least one of the equalizers) is compared with a reference value to determine a margin of error. The quantized bit value from the same equalizer (or replicated equalizer) is used to know whether the pre-quantized value corresponds to a "1" or a "0." (It is assumed that under normal operation while the adaptive error correction occurs, the receiver generates valid data, even though its error margin may be declining.) The error margin value (which may be a quantized or analog value) is then used by an adaptation circuit to adjust (if necessary) various parameters of the equalizers to account for changes in the system.

Figure 1:
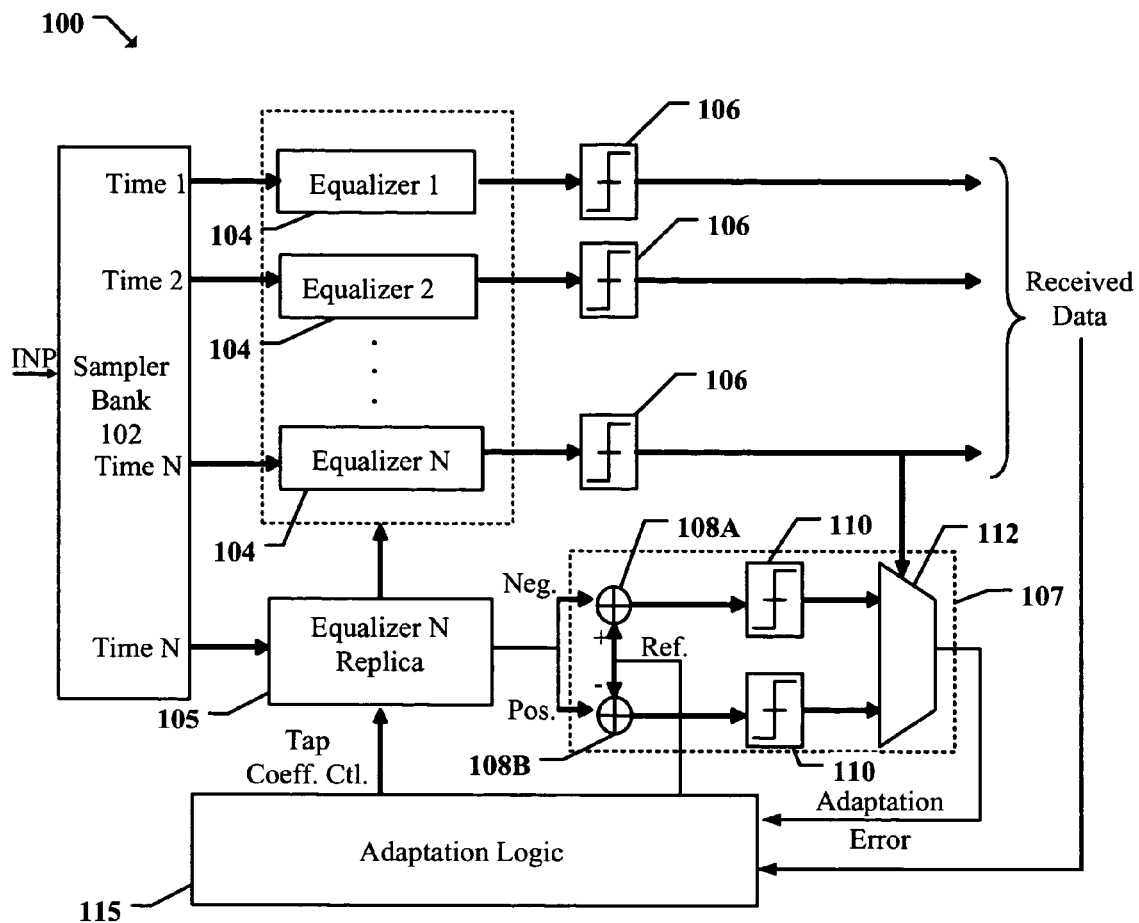
FIG. 1 is a block diagram of a receiver with adaptive equalization according to some embodiments.

With reference to FIG. 1, a block diagram of an interleaving, N-way receiver 100 incorporating adaptation according to some embodiments is shown. Receiver 100 generally comprises a sampler bank 102, N interleaving equalizers 104, an equalizer replica 105, quantizer circuits 106, a margin monitor circuit 107, and an adaptation circuit 115.

The 1 through N equalizer circuits 104 are each coupled to a unique subset of sample and hold circuits (not shown) within sampler bank 102 to interleavably receive a different time portion of an input bit stream signal (INP). For example, in some embodiments, equalizers 104 (e.g., eight equalizers) are used to interleavably extract data bits from a bit stream signal such as a differential 8 Gbps bit stream signal. In this example, each of the eight equalizers works on a separate portion of the input signal to extract every $8^{th}$ bit for its phase slot. Thus, equalizer 1 would extract bits 1, 9, 17, 25 . . . ; equalizer 2 would extract bits 2, 10, 18, 26 . . . ; and so on. In this way, each equalizer has more time to process its bit stream portion.

(Even with additional time, however, fast processing may be important. Accordingly, in some embodiments, relatively fast analog (or hybrid) decision feedback equalizers may be used. For example, current mode equalizers such as those disclosed in U.S. patent application Ser. No. 11/159,522, filed on Jun. 22, 2005 (incorporated by reference herein) could be used.)

A quantizer circuit 106 is coupled at the output of each equalizer 104. As used herein, a quantizer may be any circuit that receives a signal and quantizes it into a discrete output value. It may receive a current or voltage input, and it may produce a current or voltage output. For example, in some current-mode embodiments, a current latch may be used to receive a current signal and quantize the output signal (which may be current or voltage) into a "1" or a "0" depending on whether it is greater or less than a given threshold. Thus, the output of each equalizer provides a pre-quantized bit value, while the output of its associated quantizer 106 provides a quantized value.

A replica equalizer 105 is used to replicate one of the equalizers (equalizer N in the depicted embodiment) to produce a replicated pre-quantized bit value for the replicated equalizer (equalizer N). Accordingly, it is configured sufficiently equivalently to the replicated equalizer and receives the same input samples. Its pre-quantized bit value output is coupled to an input of the margin monitor circuit 107.

As used herein, a margin monitor circuit may comprise any suitable circuit to compare a pre-quantized bit value with a reference to generate an appropriate error signal. Margin monitor circuit 107 generally comprises adders 108A, 108B, quantizer circuits 110, and a 2:1 multiplexer 112. The adders 108A, 108B each receive the pre-equalized bit value from replica equalizer 105. Adder 108A serves as a negative version adder in case the pre-quantized value corresponds to a "0" (e.g., is a negative signal) and adds a reference value to it. Conversely, adder 108B serves as a positive version adder in case the pre-quantized bit value is a "1" (e.g., positive value) and subtracts the reference from it. (In the depicted embodiment, the reference signal comes from the adaptation circuit 115.) Each comparison result is quantized via a quantizer 110. Based on the state of the quantized bit value from equalizer N, the multiplexer 112 passes through as the adaptation error signal the appropriate quantized, comparison result from either the negative or positive version adder. That is, if the quantized value is a "1", then the positive version result (subtracted reference) is passed through the multiplexer. Likewise, if it is a "0", then the negative version result (added reference) is passed through the multiplexer. The passed through adaptation error signal is coupled to the adaptation circuit where it is used to determine appropriate equalizer settings (e.g., tap coefficients) for each equalizer 104 in accordance with known correction techniques.

As an example, in some embodiments, the equalizers and margin monitor circuit utilize at least partially current mode devices with the pre-quantized bit values being differential, current signals. Assume that a "1" corresponds to a 200 µA (or larger) signal, while a "0" corresponds to a −200 µA (or lower) signal. (For this example, assume that the quantized bit values are voltage signals and the multiplexer is a voltage-input controlled device.) Assume that the reference signal is 100 µA and the quantizer thresholds are at 0. (In this example, the margin monitor measures whether the pre-quantized signals are within a 100 µA tolerance.) If a pre-quantized bit, for example, has a value of 150 µA, it would be added to the 100 µA reference at adder 108A (yielding a 250 µA negative version result), and subtracted by the 100 µA reference at adder 108B (yielding a 50 µA positive version result). Since they are both above 0 µA, each result would be quantized to a "1" at quantizers 110. The quantized bit value would be a "1" (150 µA is greater than 0 µA and thus would quantize to a "1"). The quantized "1" would control the multiplexer 112 to pass the positive version result (a "1") as the adaptation error, which indicates that the pre-quantized signal is within the 100 µA tolerance.

Modifying the example slightly, assume that the pre-quantized value is 50 µA instead of 150 µA. In this case, the quantized value (at the output of equalizer N's quantizer) would still correctly quantize to a "1," but the positive version result (subtracted reference) would now be −50 µA, which quantizes as a "0." Thus a "0" instead of a "1" is now passed as the adaptation error signal indicating that the pre-quantized bit value is not within the error tolerance.

(It should be appreciated that many other margin monitor implementations may be suitably realized. For example, instead of using the quantized bit value from the replicated equalizer to control a multiplexer for passing either a positive or negative version result, it instead could be used to control whether the reference is added to or subtracted from the pre-quantized value. In this way, only one adder 108 and one quantizer 110 would be required. Likewise, a quantizer may not even be required. An analog signal could be provided to the adaptation circuit 115 and directly used to determine equalizer settings or quantized in the adaptation circuit. Accordingly, many suitable embodiments exist for the margin monitor (and the other) circuits within the disclosed receiver.)

The adaptation circuit 115 may comprise any suitable circuit to control and/or adjust equalizer settings (such as tap coefficients) to account for changes in the channel and/or receiver circuitry. In the depicted embodiment, the equalizers are linear feedforward equalizers that utilize a cursor, pre-cursor, and two post-cursors to generate a bit value. Accordingly, the adaptation circuit receives quantized equalizer values (receiver data) from equalizer N (cursor), equalizer N-1 (first post-cursor), equalizer N-2 (second post-cursor, and equalizer 1 (pre-cursor), along with the adaptation error signal to determine tap coefficient settings for the N equalizers. Well known techniques may be used to implement the adaptation circuit 115.

Figure 2:
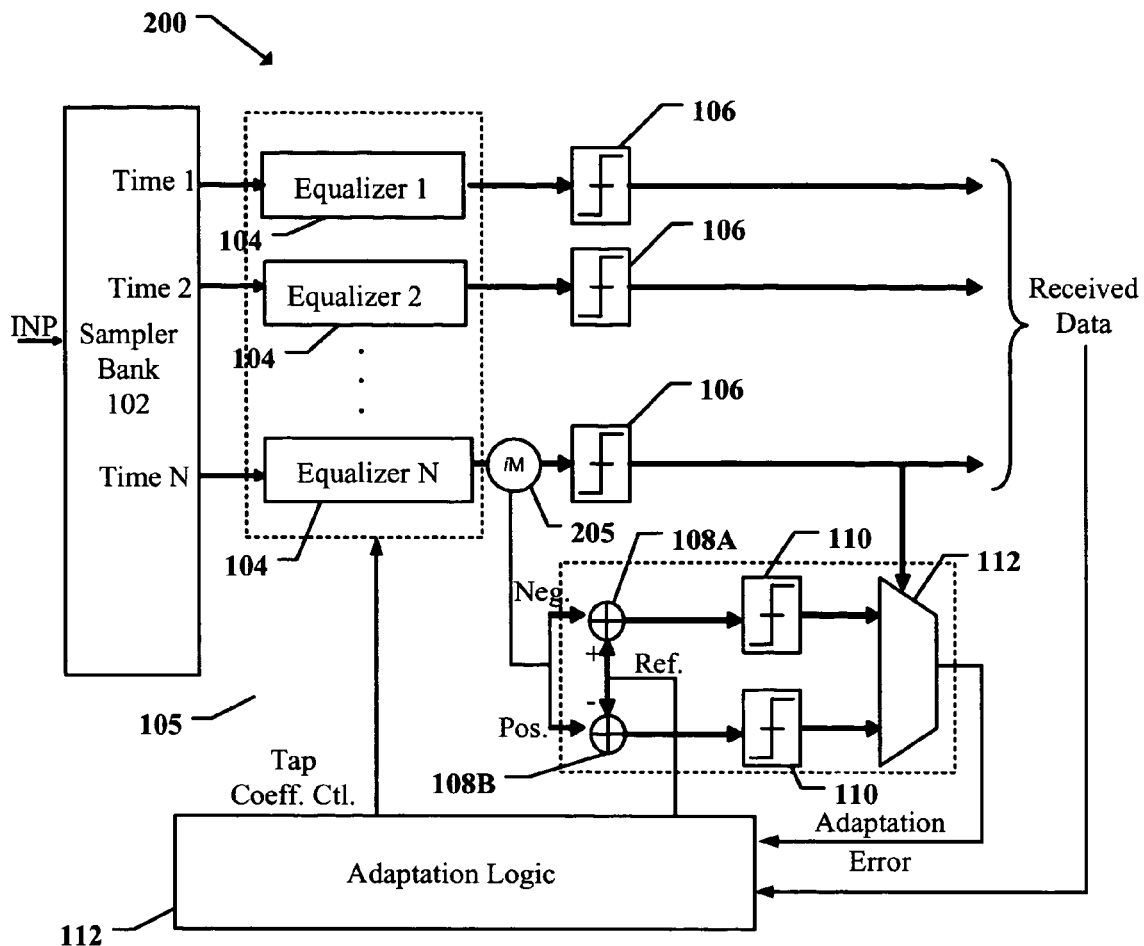
FIG. 2 is a block diagram of a receiver with adaptive equalization according to some other embodiments.

FIG. 2 shows another embodiment of an adaptive receiver 200. Receiver 200 is the same as receiver 100 except that it particularly operates in the current domain and as such, does not require a replica equalizer. Instead, it uses a current mirror 205 to provide the margin monitor circuit 107 with the pre-quantized bit value from equalizer N. Thus, with this (and similar embodiments), the overhead from an extra equalizer may be avoided.

Figure 3:
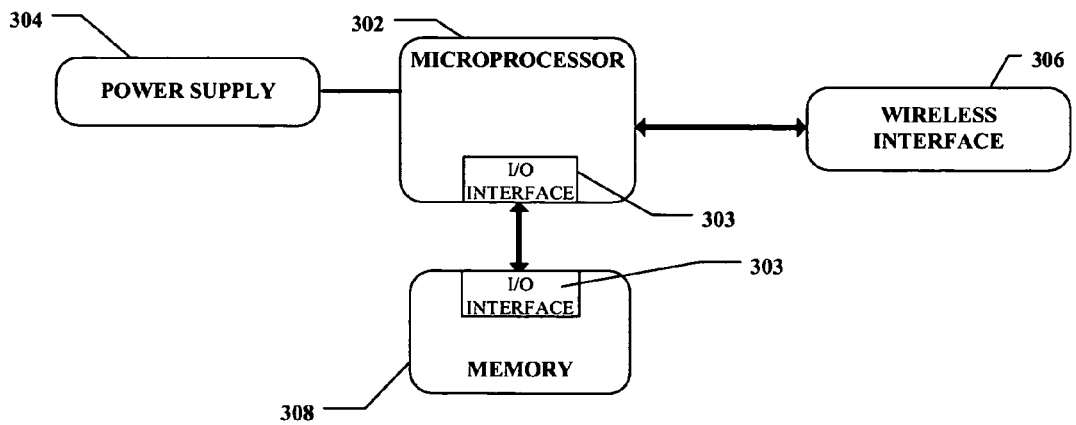
FIG. 3 is a block diagram of a computer system with at least one receiver having adaptive equalization in accordance with some embodiments of the invention.

With reference to FIG. 3, one example of a computer system is shown. The depicted system generally comprises a processor 302 that is coupled to a power supply 304, a wireless interface 306, and memory 308. It is coupled to the power supply 304 to receive from it power when in operation. It is coupled to the wireless interface 306 and to the memory 308 with separate point-to-point links to communicate with the respective components. It, along with memory component 308, includes an I/O interface 303 including a receiver having at least one receiver with adaptive equalization according to some embodiments of the invention. For example, in some embodiments, the memory may be a DDR memory component, and the receivers in I/O interfaces 303 may comprise equalizers in accordance with either the embodiments of FIG. 1 or 2. (Of course, other linear feedforward or decision feedback equalizers in accordance with embodiments of the invention may be included in any of the depicted or non-depicted blocks including but not limited to communication links within chips or between chips.)

It should be noted that the depicted system could be implemented in different forms. That is, it could be implemented in a single chip module, a circuit board, or a chassis having multiple circuit boards. Similarly, it could constitute one or more complete computers or alternatively, it could constitute a component useful within a computing system.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like. Similarly, embodiments of the invention may be implemented in a variety of applications including but not limited to short-distance applications such as multiprocessor interconnections, networking and communication switches, memory interfaces, and consumer products with extensive multimedia applications.

Moreover, it should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS. for simplicity of illustration and discussion, and so as not to obscure the invention. Furthermore, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. A circuit, comprising:
   a receiver circuit comprising:
      equalizer circuits having a plurality of equalizers to interleavably extract bit values from a bit stream and provide them as quantized bit values at outputs of the equalizers;
      a margin monitor circuit coupled to an equalizer of the equalizer circuits to receive a pre-quantized bit value and a quantized bit value to make a comparison between a reference and the received pre-quantized bit value yielding an error value based on the received quantized bit value; and an adaptation circuit coupled to (i) at least one output of the equalizers outputs to receive quantized bit values therefrom, (ii) the margin monitor circuit to receive the error value, and (iii) the equalizers to control equalizer operational settings of the equalizers based on the error value and quantized bit values as the equalizers extract unknown data from the bit stream.

2. The circuit of claim 1, in which the equalizers comprise at least partially analog linear feedforward or decision feedback equalizers.

3. The circuit of claim 1, in which the margin monitor circuit comprises a first comparator to add the reference to the pre-quantized bit value yielding a negative version result and a second comparator to subtract the reference from the pre-quantized bit value yielding a positive version result.

4. The circuit of claim 3, in which either the negative or positive version result is utilized for the error value depending on the value of the quantized bit value.

5. The circuit of claim 4, in which the margin monitor comprises a quantizer to quantize the utilized version result and provide it to the adaptation circuit.

6. The circuit of claim 1, in which the margin monitor circuit adds or subtracts the reference to the pre-quantized bit value depending on the value of the quantized bit value.

7. The circuit of claim 1, in which the equalizer settings are initially set using a training sequence in the bit stream.

8. The circuit of claim 1, in which the equalizer settings include tap coefficient settings.

9. The circuit of claim 1, in which the margin monitor circuit is coupled to the equalizer through a replica equalizer circuit.

10. A chip, comprising:
a receiver circuit comprising
  (i) an equalizer having an input to receive at least a portion of a data signal, a pre-quantized output to provide a pre-quantized data value, and a quantized output to provide a quantized data value;
  (ii) a margin monitor circuit coupled to the pre-quantized equalizer output to receive the pre-quantized data value and to the quantized output to receive the quantized data value, a comparator circuit to compare the pre-quantized data value with a reference and provide a comparison result based on the received quantized data value; and
  (iii) an adaptation circuit coupled to the margin monitor circuit to receive the comparison result and to the equalizer to control operational settings based on the comparison result.

11. The circuit of claim 10, in which the equalizer comprises at least a partially analog linear feedforward or decision feedback equalizer.

12. The circuit of claim 10, in which the margin monitor circuit comprises a first comparator to add the reference to the pre-quantized data value yielding a negative version result and a second comparator to subtract the reference from the pre-quantized data value yielding a positive version result.

13. The circuit of claim 12, in which either the negative or positive version result is provided as the comparison result depending on the value of the quantized data value.

14. The circuit of claim 13, in which the provided result is quantized and provided to the adaptation circuit.

15. The circuit of claim 10, in which the margin monitor circuit adds or subtracts the reference to the pre-quantized data value depending on the value of the quantized data value.

16. The circuit of claim 10, in which the operational settings are initially set using a training sequence in the bit stream.

17. The circuit of claim 10, in which the operational settings include tap coefficient settings.

18. The circuit of claim 10, in which the margin monitor circuit is coupled to the pre-quantized equalizer output through a replica equalizer circuit.

19. A system, comprising:
(a) a microprocessor having an I/O interface with a receiver circuit comprising:
  (i) equalizer circuits having a plurality of equalizers to interleavably extract bit values from a bit stream and provide them as quantized bit values at outputs of the equalizers;
  (ii) a margin monitor circuit coupled to an equalizer of the equalizer circuits to receive a pre-quantized bit value and a quantized bit value to make a comparison between a reference and the received pre-quantized bit value yielding an error value based on the received quantized bit value; and
  (iii) an adaptation circuit coupled to at least one output of the equalizers outputs to receive quantized bit values therefrom, to the margin monitor circuit to receive the error value, and to the equalizers to control equalizer operational settings of the equalizers based on the error value and quantized bit values as the equalizers extract unknown data from the bit stream; and
(b) a wireless interface coupled to the microprocessor to communicatively link it with a wireless network.

20. The system of claim 19, in which the equalizers comprise at least partially analog linear feedforward or decision feedback equalizers.

21. The system of claim 19, in which the margin monitor circuit comprises a first comparator to add the reference to the pre-quantized bit value yielding a negative version result and a second comparator to subtract the reference from the pre-quantized bit value yielding a positive version result.

22. The circuit of claim 21, in which either the negative or positive version result is utilized for the error value depending on the value of the quantized bit value.

* * * * *